United States Patent Office
3,531,437
Patented Sept. 29, 1970

1

3,531,437
DIMETHYLFORMAMIDE SOLUBLE PHOSPHORUS-CONTAINING POLYPYROMELLIMIDES
André Louis Armand Rio, Lyon, France, assignor to Rhone-Poulenc S.A., Paris, France, a French body corporate
No Drawing. Continuation-in-part of application Ser. No. 722,217, Apr. 18, 1968. This application Apr. 29, 1969, Ser. No. 820,313
Claims priority, application France, Apr. 26, 1967, 103,924; Jan. 18, 1968, 136,554
Int. Cl. C08g 20/32
U.S. Cl. 260—47
7 Claims

ABSTRACT OF THE DISCLOSURE

The invention provides novel polypyromellimides in which pyromellitic diimide units are linked via units derived from bis (m - aminophenyl)alkylphosphine oxide with up to 80% of units derived from a second bis-(aminophenyl) compound. These new polymers can be made into nonflammable films and moulded articles of high melting point.

---

This application is a continuation-in-part of my application Ser. No. 722,217 filed Apr. 18, 1968, now abandoned.

This invention relates to polypyromellimides and their production.

Polyimides obtained by condensation of an aromatic tetracarboxylic acid, such as pyromellitic acid, with aromatic diamines, such as m- and p-phenylenediamine, diaminodiphenylpropane, 1,5 - diaminonaphthalene and bis-(p-aminophenyl) ether, have remarkable resistance to many chemical agents and more particularly to solvents and to heat. These polycondensates resist melting when heated to 500° C., as is indicated in French Pat. No. 1,256,203.

Because of these properties, these polymers have industrial value in the production of filaments, films, sheets and insulating coatings. However, these products are difficult to employ. Their low solubility, and even insolubility, in the usual solvents excludes any possibility of spinninng filaments or casting films from polymer solutions prepared directly from such polypyromellimides. Likewise, the infusibility of these polycondensates does not permit of moulding them directly from powders.

To prepare filaments, films or moulded objects of polypyromellimides, it is necessary to use a two-stage technique which consists in shaping an object from a solution or powder of the acid polyamide, obtained by polycondensation of pyromellitic dianhydride with a diamine, and then effecting, by heating the shaped object, the formation of the imide rings with elimination of water. This process has many disadvantages, and particularly the necessity to eliminate the water which is formed in the condensation.

It has also been proposed in French Pat. No. 1,350,946 to mould polypyromellimides, derived especially from pyromellitic acid and diamines such as bis-(p-aminophenyl)phenylphosphine oxide directly, but since these polycondensates resist melting at temperatures above 500° C., it is necessary to effect moulding by sintering, at 200–500° C. under a pressure of 210–2100 kg./cm.², powders having a specific surface of at least 0.1 m.²/g.

The present invention provides new polypyromellimides which are mouldable at elevated temperature. These new polypyromellimides consist either exclusively of units of the formula:

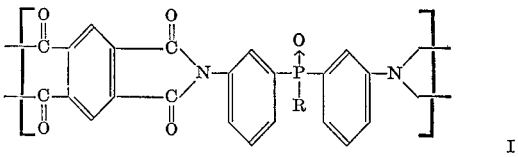

or of units of the Formula I and up to 80%, based on the total number of units of the formula:

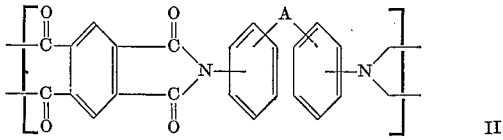

in which R is alkyl of 1 to 4 carbon atoms, such as methyl, ethyl, propyl, isopropyl, butyl, or isobutyl, or phenyl and A represents a simple valence bond or a divalent radical of formula:

$$-CH_2-, \;-\underset{\underset{CH_3}{|}}{\overset{\overset{CH_3}{|}}{C}}-, \;-O-, \text{ or } -SO_2-$$

In the mxed polypyromellimides, the numerical proportion of units of Formula II is preferably 40–60%.

Bis-(m-aminophenyl)alkylphosphine oxides, which are employed in the preparation of the new polypyromellimides are obtained by the process described in French Pat. No. 1,288,952, by nitration of alkyldiphenylphosphine oxides and reduction of the bis-(m-nitrophenyl)-alkylphosphine oxides so obtained to diamines.

According to a feature of the invention, the new polypyromellimides are prepared by heating a salt of a pyromellitic acid diester of formula:

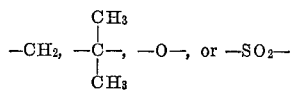

where one $R^1$ and one $R^2$ are hydrogen and the other $R^1$ and other $R^2$ are alkyl, with a bis-(m-aminophenyl)alkyl phosphine oxide of formula:

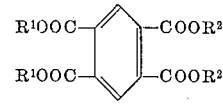

where R is as hereinbefore defined, alone or with up to 80 mol percent, based on the mixture, of a diamine of formula:

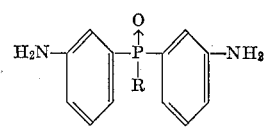

where A is as hereinbefore defined.

In this process pyromellitic anhydride may first be reacted with an excess of an alkanol of 1 to 4 carbon atoms such as methanol to form a diacid diester of Formula III, which is then converted into a salt by reaction with a bis-(m-aminophenyl)alkylphosphine oxide of Formula IV, or a mixture of this diamine with one or more diamines of the Formula V. The proportion of non-phosphorus-containing diamine in relation to all the diamines being lower than 80 mol percent and preferably between 40 and 60 mol percent. This salt is then converted into the polyamide by heating at high temperature.

According to a further feature of the invention, the new polypyromellimides are prepared by dehydrating a polypyromellamide consisting of units of formula:

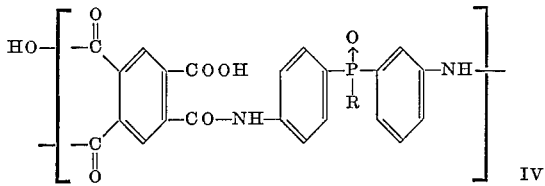

where R is as hereinbefore defined, alone or with up to 80%, based on the total number of units, of units of the formula:

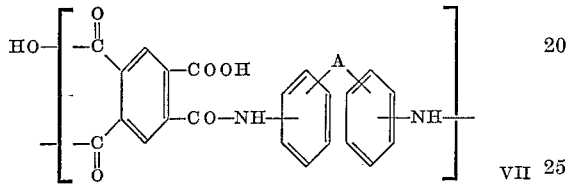

where A is as hereinbefore defined.

In this process pyromellitic anhydride may be first directly reacted with the phosphorus-containing diamine (or the mixture of diamines) in a solvent which is inert under the reaction conditions, to form the acid polypyromellamide. The latter is then converted into the polyimide, either by heating or in the cold by the action of an organic acid anhydride such as acetic anhydride in the presence of a tertiary amine such as pyridine. Suitable solvents are especially dimethylformamide and dimethylacetamide.

The new phosphorus-containing polypyromellimides generally have good solubility in solvents such as dimethylformamide, dimethylsulphoxide, dimethylacetamide and N-methylpyrrolidone, and a softening point of about 350° C., which makes possible moulding in a press. They are also incombustible. These properties render them suitable for many applications: e.g., for the production of filaments, films, sheets, insulating varnishes, moulding powders, and laminates with glass fibres.

The following examples illustrates the invention.

EXAMPLE 1

Into a round-bottomed 50-cc. flask provided with a stirring device, a thermometer and a reflux condenser are introduced 15 cc. of anhydrous methanol and 2.18 g. (0.01 mol) of pyromellitic anhydride. The mixture is heated until the anhydride dissolves, and 2.46 g. of bis-(m-aminophenyl)methylphosphine oxide (0.01 mol.) are then added. The methanol is distilled off. A white solid residue is obtained which is heated under nitrogen at 180° C. for 2 hours to eliminate the water and methanol, and then at 300° C. for 1 hour. 4 g. of a brown solid are obtained which is soluble in dimethylformamide, dimethylsulphoxide and sulphuric acid, and which has a softening temperature of 350° C. and a specific viscosity of 0.2 (measured at 25° C. on a 1% solution in sulphuric acid at 66° Baumé).

This polymer is identified by IR spectrography as the polypyromellimide derived from bis-(m-aminophenyl) methylphosphine oxide.

EXAMPLE 2

Into a round-bottomed 100-cc. flask provided with a stirring device are introduced 4.92 g. (0.02 mol.) of bis-(m-aminophenyl)methylphosphine oxide in solution in 35 cc. of dimethylacetamide. 4.36 g. of pyromellitic anhydride are added in 1 hour and 30 minutes. The temperature is maintained at 15° C. and 11.5 cc. of dimethylacetamide are added. A polymer solution is thus obtained containing 20% of acid polypyromellamide identified by IR spectrography. This polyamide is converted into the polyimide, which predipitates as a powder, by the addition of a mixture of pyridine (40%), acetic anhydride (40%), and cyclohexane (20%) to the polyamide solution. The product obtained is separated and dried.

This polymer soluble in dimethylformamide, dimethylacetamide, dimethylsulphoxide, N-methylpyrrolidone and sulphuric acid. It is identified by infra-red spectrography. Its softening point is 350° C. and its specific viscosity is 0.4 (measured as in Example 1).

A polymer solution containing 20% of solids is prepared by dissolving 5 g. of the polypyromellimide in 25 cc. of a mixture of 70% of dimethylformamide and 30% of N-methylpyrrolidone. With the aid of a caster, this solution is spread on a glass plate as a 0.3 mm. layer. The solvents are evaporated in an oven at 100° C. under an absolute pressure of 20 mm. Hg for 2 hours. A transparent film having a thickness of 0.04 mm. is obtained which has a tensile strength of 600 kg./cm.$^2$ and an elongation at break of 4%.

EXAMPLE 3

Into a round-bottomed 100-cc. glass flask provided with a stirring device on introduced 4.92 g. (0.02 mol.) of bis-(m-aminophenyl)methylphosphine oxide and 35 cc. of dimethylformamide. Pyromellitic anhydride is then added, first 4 g. in 30 minutes and then 0.70 g. in 30 minutes, at the same time as 11.5 cc. of dimethylformamide. The contents of the flask are maintained at 15° C. with stirring for 2 hours 15 minutes. A solution containing 20% of polycondensate is obtained. The latter is precipitated by adding the solution to 300 cc. of acetone. The precipitated polymer is ground, washed with acetone, and dried at 150° C. under reduced pressure (15 mm. Hg) for 4 hours, whereafter the temperature is gradually raised to 300° C. under a pressure of $10^{-3}$ mm. Hg and maintained at this level for 1 hour. 8.2 g. of a yellow powder are thus obtained having a specific viscosity of 0.65 at 25° C. in 1% solution in N-methylpyrrolidone. This polymer is identified in infra-red spectrography as the polypyromellimide derived from methyl-bis-(m-aminophenyl)phosphine oxide. It has a Vicat point of 316–314, a molecular weight of 19,000 measured by light diffusion, and a softening zone between 345° and 390° C.

Test pieces having sides of 4 cm. and a thickness of 2 mm. are prepared from this polymer by the following procedure. 5 g. of the polypyromellimide are introduced between the plates of a press and heated at 275° C. for 3 minutes under normal pressure and then for 3 minutes under a pressure of 600 kg./cm.$^2$. The moulding is completed by heating at 370° C. for 5 minutes under normal pressure and then for 5 minutes under a pressure of 600 kg./cm.$^2$. Transparent amber-coloured test pieces are obtained which are subjected to a thermal stability test consisting in heating the test pieces at 25° C., and 220° C. and 250° C. respectively for 8 days. The flexural strength of each of these test pieces is then determined in accordance with standard ASTM D79,062. The result obtained are given in the following Table I.

TABLE I

| Temperature of the thermal stability test, ° C | 25 | 220 | 250 |
|---|---|---|---|
| Breaking load in kg./mm.$^2$ | 11.6 | 11.6 | 11.6 |
| Elongation of the external fibre in mm | 3.3×10$^{-2}$ | 3.2×10$^{-2}$ | 2.9×10$^{-2}$ |

The test pieces have a resistivity of 7×10$^{14}$ Ω cm., a disruptive voltage of 7.5 kv., and a dielectric strength of 4 kv./mm.

EXAMPLE 4

Various polyamide acids are prepared in solution by the following process:

Into a 250-cc. round-bottomed flask provided with a stirring device and a dry nitrogen circulation system are introduced bis-(m-aminophenyl)methylphosphine oxide, bis(p - aminophenyl)methane (DDM by abbreviation) or bis-(p-aminophoneyl)ether (DDE by abbreviation), N-methylpyrrolidone (NMP), and dimethylformamide (DMF). 10.9 g. (0.05 mol.) of pyromellitic anhydride are then added in half an hour, the temperature being maintained at about 15° C. The mixture is allowed to react for 2 hours 25 mintues at 15° C. with stirring, and a 25% solution of polyamide acid in thus obtained.

Table II below indicates the nature and the quantity of the reactants employed in the preparation of these solutions, and also the specific viscosity $\eta$ of the polyamide acide measured in 1% solution in a mixture of solvents employed for the preparation.

TABLE II

| Polyamide acid | Weight of phosphorus-containing diamine in g. | Nature of the non-phosphorus-containing diamine | Weight of non-phosphorus-containing diamine in g. | Numerical percentage of units of formula II | Volume of NMP in cc. | Volume of DMF in cc. | $\eta$ |
|---|---|---|---|---|---|---|---|
| 1 and 6 | 7.375 | D D M | 3.960 | 40 | 62 | 29 | 1.72 |
| 2 | 6.150 | D D M | 4.950 | 50 | 60 | 28 | 1.61 |
| 7 | 4.925 | D D M | 5.950 | 60 | 61 | 28 | 1.00 |
| 3 and 8 | 7.375 | D D E | 4.000 | 40 | 60 | 29 | 2.31 |
| 4 | 6.150 | D D E | 5.000 | 50 | 60 | 28 | 1.33 |
| 5 and 9 | 4.925 | D D E | 6.000 | 60 | 59 | 28 | 1.50 |

Production of moulded objects

The polyamide acid is precipitated by the addition of the solution, with stirring, to 1 litre of water. It is ground, washed with water, and dried for 4 hours at 150° C. under reduced pressure (200 mm. Hg). The temperature is then gradually raised to 300° C. under a reduced pressure of $10^{-3}$ mm. Hg and the polycondensate is allowed to stand for 1 hour under these conditions.

A yellow powder is thus obtained which is insoluble in the usual solvents and which softens at about 370° C. Cylindrical test pieces having a diameter of 70 mm. and of a thickness of about 2 mm. are then formed by the following procedure. 12 g. of the polyimide powder are introduced between the plates of a press supporting the mould, and the temperature is raised to 370° C. for 2 minutes under normal pressure and then for 1 minute under 600 kg./cm.² The various test pieces are placed in an enclosed space at 230° C. having a relative humidity of 50% for 168 hours. Some of the test pieces are tested for their flexural strength in accordance with the standard ASTM D790-62 (the results are expressed in kg./mm.²). The other test pieces are subjected to an additional treatment for 168 hours at 250° C., and the same tests for mechanical properties are then made as on the other test pieces.

Table III indicates the results obtained for different polyimides to which the same ordinal number is attributed as to the polyamide acids from which they are derived.

TABLE III

| Nature of the polyimide | Flexural strength | |
|---|---|---|
| | Before subjection to 250° C. | After subjection to 250° C. |
| 1 | 15.5 | 7.1 |
| 2 | 10 | 7.1 |
| 3 | 9.7 | 5.3 |
| 4 | 5.7 | 6.5 |
| 5 | 6.6 | 6.25 |

Preparation of films

The acid polyamide solutions are spread by means of a caster on a glass plate as layers 0.3 mm. thick. The solvents are evaporated in an oven at 100° C. under a partial vacuum (200 mm. Hg) for 2 hours. The temperature is then gradually raised to 300° C. under reduced pressure ($10^{-3}$ mm. Hg), and left for 1 hour under these conditions. Transparent films about 0.04 mm. thick are thus obtained. Some of these films are tested for tensile strength at break under the conditions indicated by the standard AFNOR T46-002 (of August, 1951). Some of the other films are left at 250° C. for 168 hours and the remainder are left at 300° C. for 168 hours. The same tests for mechanical properties are applied to these films as to the films which have not undergone any particular thermal treatment. Table IV gives the results obtained in kg./cm.²

TABLE IV

| Nature of the polyimide | Tensile strength | | |
|---|---|---|---|
| | After 168 h. at 25° C. | After 168 h. at 25° C. and 168 h. at 250° C. | After 168 h. at 25° C. and 168 h. at 300° C. |
| 6 | 1015 | 360 | |
| 7 | 1020 | 235 | |
| 8 | 1050 | 850 | 410 |
| 9 | 1075 | 1035 | 965 |

Self-extinguishing test

Test pieces of each of the polyimides 1 to 5 are subjected to the action of the flame from a gas and compressed-oxygen blowpipe. The test pieces carbonise in the flame without evolving appreciable quantities of combustible gas. When withdrawn from the flame, they do not burn.

EXAMPLE V

Into a 250 cc. round-bottomed flask provided with a stirring device, a thermometer, and a reflux condenser, and maintained at 15° C., 24 cc. of N-methylpyrrolidone and 3.08 g. of bis(m-aminophenyl)phenylphosphine oxide are introduced. Pyromellitic anhydride is added in portions of 545 mg. each every ten minutes until 2.18 g. in all have been added. The reaction mixture is kept for a further hour at 15° C. and then poured into water. The precipitate is filtered off, washed with water, and dried in a stove at 150° C. under 200 mm. Hg pressure. The dried precipitate is then heated progressively over two hours to 300° C. and kept at this temperature for one hour. 4.7 g. of the polypyromellimide of bis(m-aminophenyl)phenylphosphine oxide are thus obtained softening at about 375° C.

I claim:
1. A film-forming polypyromellimide consisting of 100 to 20% of units based on the total number of units of the formula:

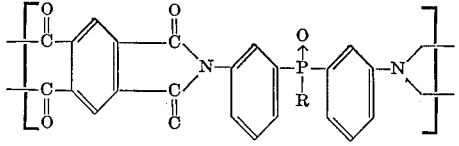

and 0 to 80% of units of the formula:

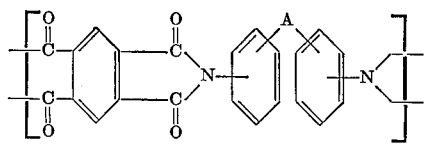

in which R is alkyl of 1 to 4 carbon atoms or phenyl, and A represents a single bond: $-CH_2-$, $-C(CH_3)_2-$, $-O-$, or $SO_2-$.

2. A polypyromellimide according to claim 1 consisting exclusively of units of the first formula.

3. A polypyromellimide according to claim 1 consisting of 60 to 40% of units of the first formula and 40 to 60% of units of the second formula.

4. A polypyromellimide according to claim 2 in which R is methyl.

5. A polypyromellimide according to claim 3 in which R is methyl and A is methylene in position para to both nitrogen atoms.

6. A polypyromellimide according to claim 3 in which R is methyl and A is —O— in position para to both nitrogen atoms.

7. A polypyromellimide according to claim 2 in which R is phenyl.

References Cited
UNITED STATES PATENTS 3,179,634  4/1965  Edwards _____ 260—78

WILLIAM H. SHORT, Primary Examiner

L. L. LEE, Assistant Examiner

U.S. Cl. X.R.

260—30.8, 32.4, 32.6, 78; 264—120, 331